US011644828B2

(12) United States Patent
Griffin et al.

(10) Patent No.: US 11,644,828 B2
(45) Date of Patent: *May 9, 2023

(54) NAVIGATION SYSTEM WITH CAMERA ASSIST

(71) Applicant: Textron Innovations Inc., Providence, RI (US)

(72) Inventors: Maurice D. Griffin, San Antonio, TX (US); Aaron M. Hitchcock, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/244,652

(22) Filed: Apr. 29, 2021

(65) Prior Publication Data

US 2022/0050459 A1 Feb. 17, 2022

Related U.S. Application Data

(63) Continuation of application No. 16/528,030, filed on Jul. 31, 2019, now Pat. No. 11,022,972.

(51) Int. Cl.
*G05D 1/00* (2006.01)
*G08G 5/00* (2006.01)
(Continued)

(52) U.S. Cl.
CPC ......... *G05D 1/0094* (2013.01); *G05D 1/0011* (2013.01); *G05D 1/102* (2013.01);
(Continued)

(58) Field of Classification Search
CPC .... G05D 1/0094; G05D 1/0011; G05D 1/102; G06T 7/292; G06T 2207/10032;
(Continued)

(56) References Cited

U.S. PATENT DOCUMENTS 8,723,789 B1    5/2014  Rafii
10,372,133 B2 * 8/2019  Tanaka .................. G06V 20/176
(Continued)

FOREIGN PATENT DOCUMENTS

CN    104950904 A      9/2015
CN    106485655 A  *   3/2017  ............. B64D 39/00
(Continued)

OTHER PUBLICATIONS

Trevor Layh, et al., "GPS-Denied Navigator for Small UAVs," Final Report, University of Minnesota UAV Laboratory, Department of Aerospace Engineering & Mechanics, Oct. 8, 2014, 35 pages.
(Continued)

*Primary Examiner* — Mahendra R Patel
(74) *Attorney, Agent, or Firm* — Akona IP

(57) ABSTRACT

One embodiment is a navigation system for an aircraft including a positioning system to generate information related to a position of the aircraft, a group of cameras mounted to a body of the aircraft, each camera of the group of cameras to simultaneously capture images of a portion of an environment that surrounds the aircraft, and a processing component coupled to the positioning system and the group of cameras, the processing component to determine a current position of the aircraft based on the information related to the position of the aircraft and the images.

20 Claims, 11 Drawing Sheets

(51) Int. Cl.
*G05D 1/10* (2006.01)
*G06V 20/13* (2022.01)
*G06T 7/292* (2017.01)

(52) U.S. Cl.
CPC .............. *G06T 7/292* (2017.01); *G06V 20/13* (2022.01); *G08G 5/0047* (2013.01)

(58) Field of Classification Search
CPC ........... G06T 2207/30244; G06T 7/285; G06T 2207/10012; G06T 2207/30261; G06V 20/13; G06V 20/17; G08G 5/0047; B64C 2201/123; B64C 2201/127; B64C 39/024
USPC ........................................................ 382/104
See application file for complete search history.

(56) References Cited

U.S. PATENT DOCUMENTS

| | | | |
|---|---|---|---|
| 2006/0012673 A1* | 1/2006 | Koselka | H04N 13/239 348/42 |
| 2007/0032924 A1 | 2/2007 | Foucart et al. | |
| 2007/0276553 A1 | 11/2007 | Bitar et al. | |
| 2009/0265089 A1 | 10/2009 | Gauffriau et al. | |
| 2010/0250022 A1* | 9/2010 | Hines | G05D 1/0044 701/2 |
| 2011/0022251 A1* | 1/2011 | Puig | G05D 1/0083 701/16 |
| 2012/0249741 A1 | 10/2012 | Maciocci et al. | |
| 2016/0202695 A1* | 7/2016 | Deroos | G01C 21/20 701/2 |
| 2017/0192089 A1* | 7/2017 | Parker | H04K 3/45 |
| 2017/0192435 A1 | 7/2017 | Bakhishev et al. | |
| 2017/0319426 A1 | 11/2017 | Dayal et al. | |
| 2017/0337824 A1* | 11/2017 | Chen | G08G 5/0086 |
| 2018/0210465 A1* | 7/2018 | Qu | B64D 47/08 |
| 2018/0350093 A1 | 12/2018 | Sweet et al. | |
| 2018/0350104 A1* | 12/2018 | Lozano | G06T 7/75 |
| 2019/0011703 A1* | 1/2019 | Robaina | A61B 90/36 |
| 2019/0094149 A1* | 3/2019 | Troy | G05D 1/102 |
| 2019/0118963 A1* | 4/2019 | Lozano | G06T 7/20 |
| 2019/0124244 A1 | 4/2019 | Knoll et al. | |
| 2019/0281235 A1 | 9/2019 | Breuer et al. | |
| 2019/0340775 A1 | 11/2019 | Lee et al. | |
| 2020/0073398 A1 | 3/2020 | Niewiadomski et al. | |
| 2020/0242748 A1 | 7/2020 | Chen et al. | |
| 2020/0341117 A1* | 10/2020 | Sandford | G01S 17/93 |

FOREIGN PATENT DOCUMENTS

| | | | | |
|---|---|---|---|---|
| CN | 108564626 A | * | 9/2018 | ............ G06T 7/004 |
| CN | 112567201 A | * | 3/2021 | ............ G06F 16/51 |
| EP | 3460392 A2 | * | 3/2019 | .......... B64C 39/024 |
| WO | WO-2005017818 A1 | * | 2/2005 | .......... G06K 9/3241 |
| WO | WO-2005088541 A1 | * | 9/2005 | ............ G06T 7/004 |
| WO | WO-2006089776 A1 | * | 8/2006 | .......... G08B 13/194 |
| WO | WO-2009125304 A2 | * | 10/2009 | .......... B64D 47/08 |
| WO | WO-2017030737 A1 | * | 2/2017 | .......... B64C 39/024 |
| WO | WO-2017041303 A1 | * | 3/2017 | .......... G08B 13/194 |
| WO | WO-2018134677 A1 | * | 7/2018 | ............ G05D 1/102 |

OTHER PUBLICATIONS

UAV Expert News, "GPS-Denied Navigation on Small Unmanned Helicopters," Jan. 25, 2019, 3 pages; http://www.uavexpertnews.com/2019/01/gps-denied-navigation-on-small-unmanned-helicopters/.

* cited by examiner

NAVIGATION SYSTEM WITH CAMERA ASSIST

CROSS-REFERENCE TO RELATED APPLICATION

This application is a continuation and claims the benefit of priority under 35 U.S.C. § 120 of U.S. application Ser. No. 16/528,030 filed on Jul. 31, 2019, entitled "NAVIGATION SYSTEM WITH CAMERA ASSIST," Inventors: Maurice D. Griffin, et al. The disclosure of the prior application is considered part of and is incorporated in its entirety by reference in the disclosure of this application.

TECHNICAL FIELD

This disclosure relates generally to aircraft and, more particularly, to a navigation system for an aircraft.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tail-sitter." As the name implies, a tail-sitter takes off and lands on its tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller.

Aircrafts may utilize positioning systems, such as global positioning systems (GPSs), for determining a current location of the aircraft. The positioning systems can utilize over-the-air communication to provide information to a navigation system of the aircraft for determining the current location of the aircraft. However, the positioning systems may become unavailable, such as via the over-the-air communication connection being lost, and can cause the aircraft to lose track of the current location of the aircraft when the positioning systems are unavailable.

SUMMARY

An embodiment is a navigation system for an aircraft. The navigation system includes a positioning system to generate information related to a location of the aircraft, a group of cameras mounted to a body of the aircraft, each camera of the group of cameras to simultaneously capture images of a portion of an environment that surrounds the aircraft, and processing component coupled to the positioning system and the group of cameras, the processing component to determine a current location of the aircraft based on the information related to the position of the aircraft and the images.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
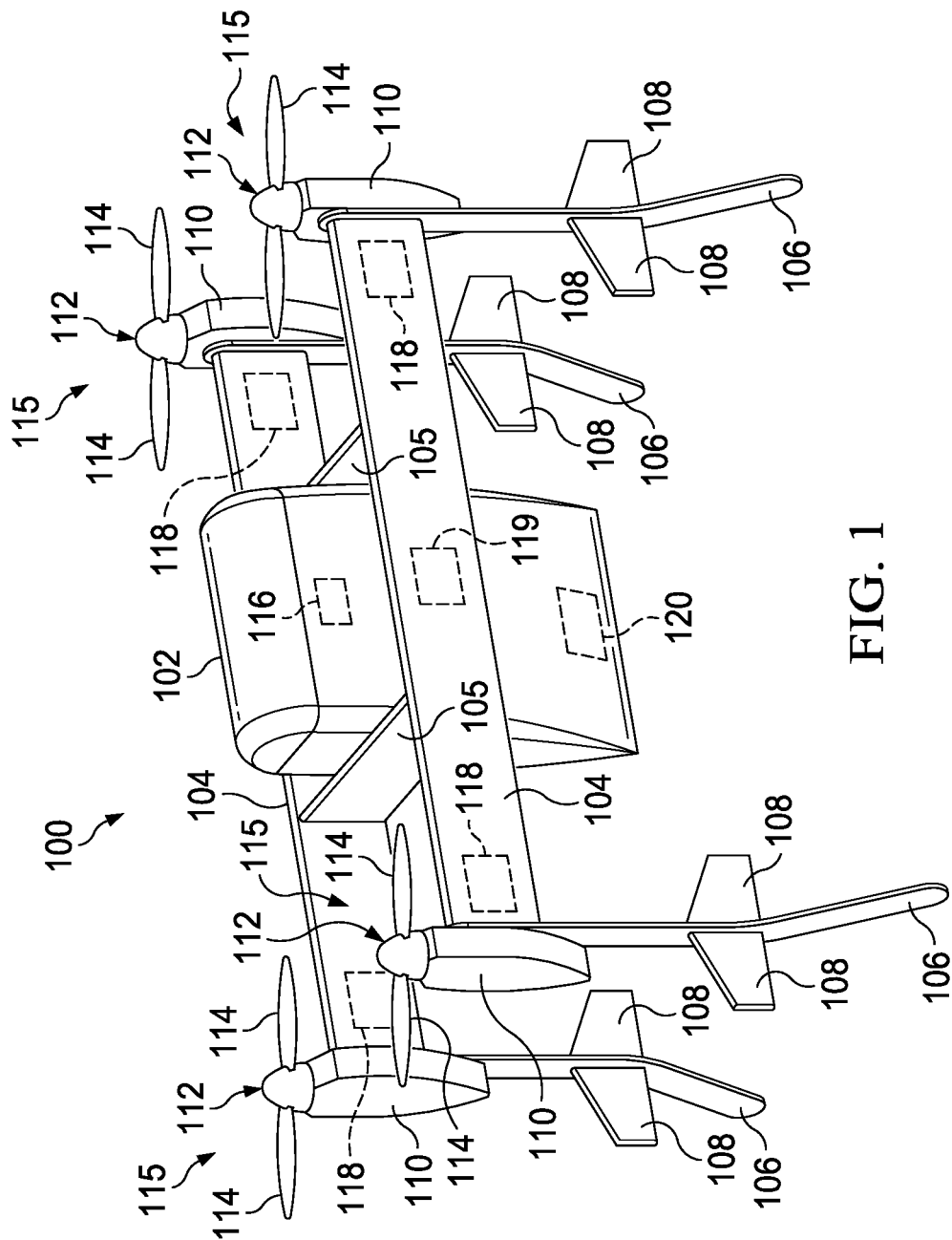
FIG. 1 is an oblique view of an example aircraft configured for operation in a helicopter flight mode in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this disclosure, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

As referred to herein in this disclosure, the term "simultaneously" is used to refer to actions occurring at substantially the same time. In particular, it is to be understood that actions that occur at the same time and actions that differ in time due to processing delays, propagation delays, and/or other delays in operation of components are included in the term "simultaneously" as used throughout this disclosure.

As referred to herein in this disclosure, the term "global location" is used to refer an indication of a location relative to a coordinate system applied to the earth. For example, "global location" can refer to a combination of a latitude and a longitude that indicates a certain location.

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

As markets emerge for autonomous unmanned aircraft (or "UAVs") to deliver packages with minimal-to-no human interaction, it becomes important for the aircraft to be able to adjust its flight control gains for a wide range of weights and center of gravity ("CG") locations. This is particularly challenging for VTOL UAVs when the payload's weight and CG location is unique for every package the UAV picks up. The fact that such aircraft are required to perform precision landings makes it important that their control systems are performing at their peak. In accordance with the teachings of certain embodiments described herein, in response to a triggering event, such as closure of the cargo pod, the aircraft is caused to enter a low hover state and execute a short series of maneuvers. Such maneuvers may include a roll maneuver (i.e., a rotation about a longitudinal (front to rear) axis of the aircraft, defined herein as the X axis), a pitch maneuver (i.e., a rotation about a lateral (right to left) axis of the aircraft, defined herein as the Y axis) and/or a yaw maneuver (i.e., a rotation about a vertical (top to bottom) axis of the aircraft, defined herein as the Z axis). The response of the aircraft to the series of series of maneuvers is detected by a number of sensors and is used to evaluate the aircraft's overall gross weight, CG location, and payload inertia. The aircraft's Flight Control System ("FCS") uses the determined weight, CG location and/or payload inertia data to index one or more lookup tables (or as input into one a numerical model) populated with optimal control data developed during characterization flights for a variety of weight, CG, and/or payload inertia combinations. In particular, the optimal control data includes optimal control gains to be applied during operation of the aircraft under a particular combination of weight, CG, and/or payload inertia conditions. In particular, the one or more "most like" response(s) from the lookup table(s)/numerical model are used to assign the associated control gains. In effect, the aircraft performs the maneuvers to "feel" its own weight and CG, as well as the inertia of the payload, after which the aircraft's FCS applies the control gains output from the table(s)/numerical model in operating the aircraft. For example, throttle gain may be adjusted to account for the overall weight of the vehicle including payload. The greater the overall weight, the more the vehicle will benefit from a higher throttle gain in order to get the same reaction from the vehicle without payload; however, increasing the throttle gain too much will cause the vehicle to oscillate.

In certain embodiments, the FCS may alternatively and/or additionally leverage sensors deployed at a kiosk or launch point, which sensors may provide differential GPS information for enabling precise determination of the location and altitude of the aircraft, as well as access to information regarding wind conditions, air temp and pressure to further improve the ability of the FCS of the aircraft to estimate the aircraft's weight and CG and the effect thereof on the control gains under present conditions.

In still other embodiments, the series of maneuvers may also be used by the FCS to determine whether the payload being picked up contains an unsecured object (which may be indicated by the detected inertia of the payload), which may make the aircraft unstable during flight. In such cases, the aircraft may take remedial measures to avoid flight problems, such as aborting takeoff and/or returning the payload to a kiosk until the situation can be corrected. Such embodiments may thereby improve the accuracy and performance of an aircraft after it picks up a payload by verifying that the payload is properly secured and has a stable CG.

In still other embodiments, an enterprise system may provide the aircraft with payload weight, CG, and/or inertia and the maneuvers may be performed in order to verify the accuracy of the information provided, and thereby verify the identity of the payload. Should the provided payload weight, CG, and/or inertia information not correspond to the detected payload weight, CG and/or inertia information, the aircraft may take remedial measures, such as aborting takeoff and/or alerting the enterprise system of the discrepancy. In an alternative embodiment, the aircraft may omit performing the maneuvers (in an effort to increase the overall speed of payload delivery) and may combine the payload information provided by the enterprise system with known information regarding the weight, CG, and/or inertia of the aircraft, and use the combined information as input to the lookup table(s)/numerical model to determine optimal flight controls/control gains for the loaded aircraft.

In yet other embodiments, payload physical characteristics, such as weight, CG, and inertia, may be provided by a remote pilot system or may be received into the FCS through a payload sensor reading or detecting a shipping label, QR code, RFID tag, or other identifying feature associated with the payload that associates such physical characteristics with the payload.

Disclosed herein are embodiments of a vertical takeoff and landing (VTOL) aircraft that includes a cargo area, such as a cargo pod. The cargo area, or pod, is configured to receive payloads of various shapes, sizes, and weights. In some embodiments, the cargo pod may include inflatable bladders. In such embodiments, once a payload is secured within the cargo pod, the bladders may be inflated to a predetermined or preprogrammed pressure based on the characteristics (e.g., shape, size, weight, etc.) or nature (e.g., weight distribution) of the payload and/or to maintain a CG of the pod with payload. Further, in some embodiments of this disclosure, the inflatable bladders are inflated in response to a closing of the cargo pod or other initializing event.

During operation and flight of the aircraft, which can include vertical takeoff and landing, hover, sideward, rearward, and forward flight, the center of gravity of the aircraft can change. The shift in the center of gravity is detected by one or more sensors and may be the result of the payload shifting, addition or removal of one or more payload components, a change in operation of the aircraft, and/or the use of fuel by the aircraft. The aircraft disclosed herein includes a flight control system ("FCS") that adaptively selects optimal control gains of the aircraft based on weight, CG, and/or payload inertia, thereby effectively and adaptively optimizing operation of the aircraft during helicopter, transition, and airplane modes so as to optimize payload transportation speed and safety.

Accordingly, this disclosure contemplates a vertical takeoff and landing (VTOL) aircraft comprising a cargo pod and having an FCS configured to adaptively select and apply aircraft control gains in order to optimize operation of the aircraft during transportation of a payload to its intended destination. Still further, in embodiments of this disclosure, the aircraft may be fully autonomous and self-directed via a predetermined or preprogrammed location-based guidance system (e.g., global positioning system (GPS), coordinate-based location, street address, etc.) to allow for accurate delivery of the payload to its intended destination.

Figure 2:
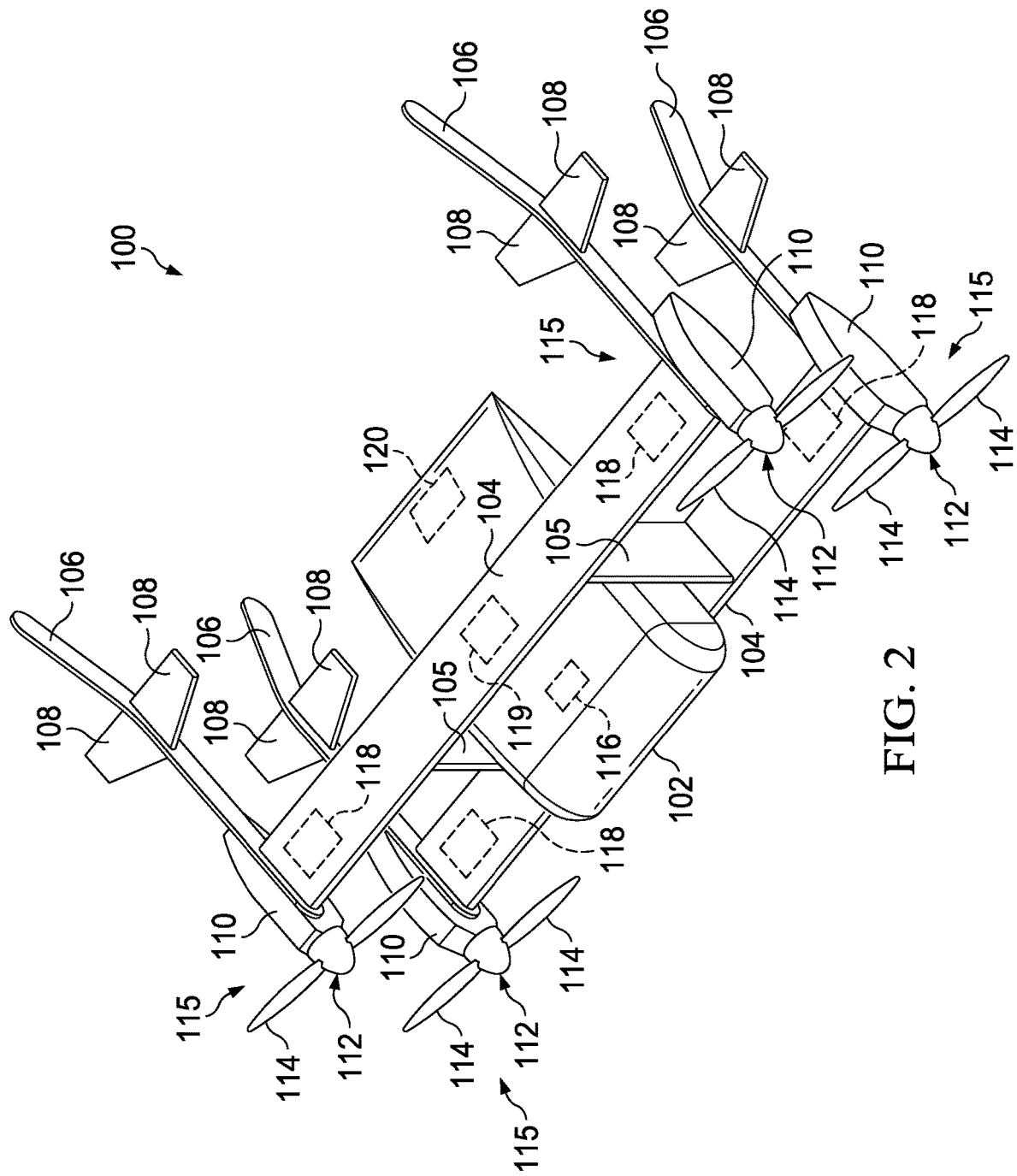
FIG. 2 is an oblique view of the example aircraft of FIG. 1 configured for operation in an airplane flight mode in accordance with embodiments described herein.

Referring now to FIGS. 1 and 2, oblique views of an example aircraft 100 are shown according to this disclosure. Aircraft 100 is generally configured as a vertical takeoff and landing ("VTOL") aircraft, more specifically an autonomous pod transport ("APT") convertible drone aircraft, that is operable in a helicopter mode (shown in FIG. 1) associated with vertical takeoff from and landing to a landing zone, hover, and sideward and rearward mobility or flight, and an airplane mode (shown in FIG. 2) associated with forward flight. Additionally, since aircraft 100 is a convertible aircraft, it is also operable in a conversion mode when transitioning between the helicopter and airplane modes. Further, being a drone-type aircraft, aircraft 100 is configured for remote control and operation. Additionally, at least in some embodiments, aircraft 100 may be fully made autonomous and self-directed via a predetermined or preprogrammed location-based guidance system (e.g., global positioning system ("GPS"), coordinate-based location, street address, etc.).

Aircraft 100 comprises a cargo pod 102 that may function as the aircraft fuselage, biplane wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 also comprises a payload sensor 116, a plurality of aircraft sensors 118, an orientation sensor 119, and a control system 120. Wings 104 comprise a substantially parallel, double-wing configuration that provides lift to the aircraft 100 during forward flight while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 provide a wider base for the landing gear. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor. However, in other embodiments, the rotor systems 112 may be driven by a combustion engines or auxiliary power unit through a plurality of interconnect driveshafts and/or auxiliary gearboxes. Furthermore, since aircraft 100 functions as a convertible aircraft, the rotational speeds of each rotor system 112 may be selectively controlled to orient aircraft 100 in the various flight modes.

Figure 3:
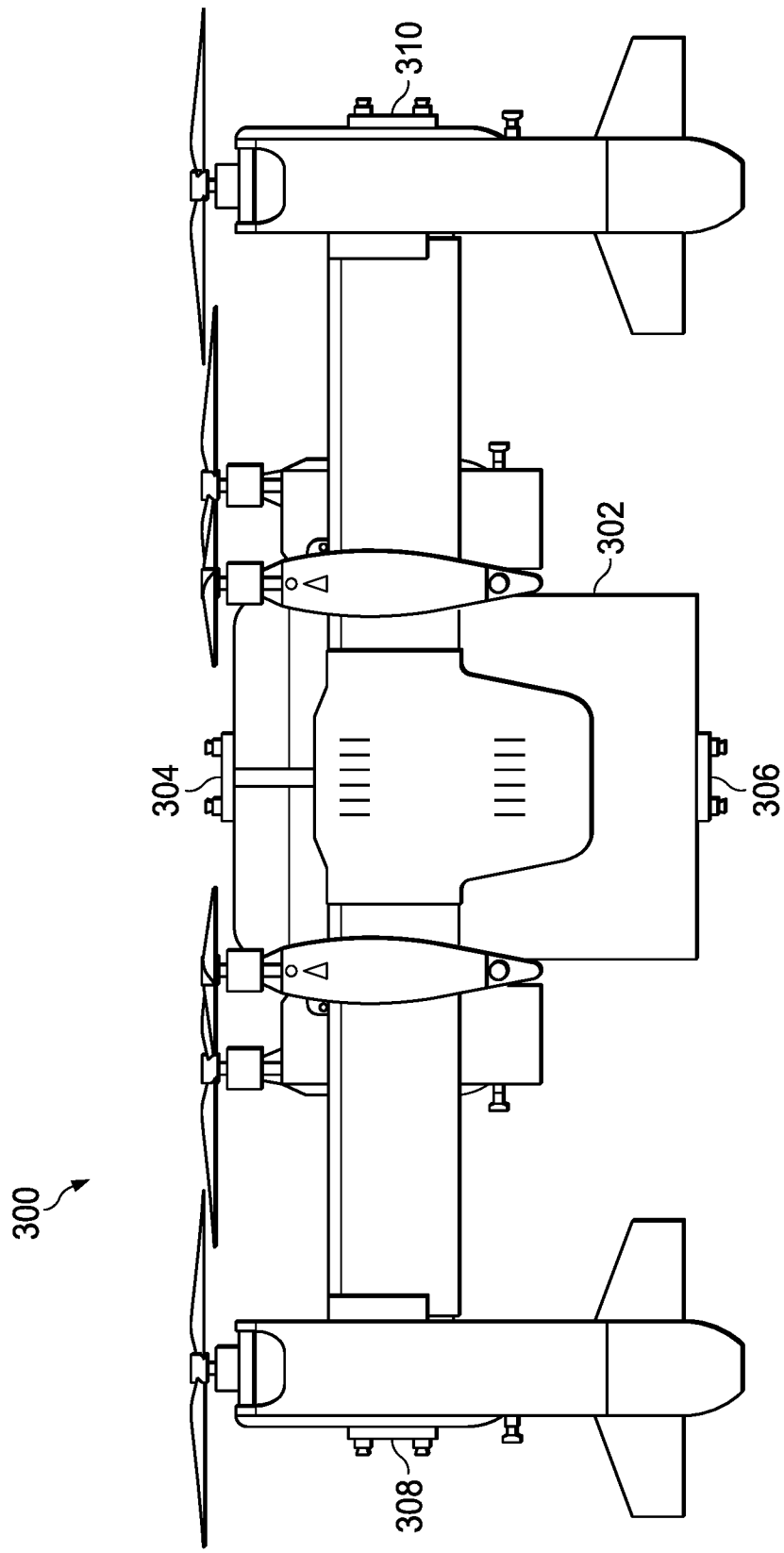
FIG. 3 is a top view of an example aircraft in accordance with embodiments described herein.

FIG. 3 is a top view of an example aircraft 300 in accordance with embodiments described herein. The aircraft 300 can include one or more of the features of the aircraft 100. In some embodiments, the aircraft 300 may comprise any type of aircraft, such as an airplane, a helicopter, a convertible aircraft, or other types of aircrafts.

The aircraft 300 includes a body 302. The body 302 may include a fuselage of the aircraft 300 and the wings of the aircraft 300. In some embodiments, the body 302 may include a fuselage (such as the cargo pod 102 (FIG. 1)), wings (such as biplane wings 104 (FIG. 1)), vertical supports (such as the vertical supports 105 (FIG. 1)), tail booms (such as the tail booms 106 (FIG. 1)), horizontal stabilizers (such as the horizontal stabilizers 108 (FIG. 1)), pylons (such as the pylons 110 (FIG. 1)), or some combination thereof.

The aircraft 300 further includes one or more groups of cameras. For example, the aircraft 300 includes a first group of cameras 304, a second group of cameras 306, a third group of cameras 308, and a fourth group of cameras 310. Each group of cameras can be mounted to the body 302 of the aircraft 300. Each group of cameras can be directly mounted to the body 302 or mounted to the body 302 by a corresponding mounting structure. Each group of cameras includes two or more cameras. The cameras may comprise stereoscopic cameras, where the stereoscopic cameras can be utilized for determining distances to objects appearing in images captured by the stereoscopic cameras. The stereoscopic cameras may be low-resolution stereoscopic cameras, where the resolution of the low-resolution stereoscopic cameras is at or below 640×512 pixels. In some embodiments, the stereoscopic cameras may be night vision, stereoscopic cameras.

Each camera within a group of cameras can be directed in a same direction, where each camera captures images in that direction. For example, the first group of cameras 304 are directed in front of the aircraft 300, the second group of cameras 306 are directed behind the aircraft 300, the third group of cameras 308 are directed to one side of the aircraft 300, and the fourth group of cameras 310 are directed to the other side of the aircraft 300 in the illustrated embodiment. Cameras within a group of cameras may have overlapping fields of view. Accordingly, the cameras within a group of cameras may each capture a portion of the environment surrounding the aircraft 300, where the portion of the environment is located within the fields of view of each of the cameras.

Each camera within a group of cameras can be physically offset from the other cameras within the group of cameras. In particular, each camera within the group of cameras may be mounted to the aircraft 300 with distance between the other cameras in the group. The distance between each of the cameras may be uniform, such that each camera is separated by equal distance from the closest other cameras in the group of cameras.

Each group of cameras may be coupled to a processing component (such as the processing component 1502 (FIG. 5)). The processor may control the operation of each group of cameras. For example, the processor can control the capturing of images by the groups of cameras by triggering the cameras. The processor can cause each of the cameras within a group of cameras to simultaneously capture a corresponding image. Further, the processor can cause all groups of cameras to capture images at the same time, or can cause different groups of the cameras to capture the images at different times. The processor may retrieve the images from each of the cameras and can utilize the images to determine a position of the aircraft 300, as described throughout this disclosure.

While the illustrated aircraft 300 includes four groups of cameras, it is to be understood that aircrafts in other embodiments may include one or more groups of cameras. Further, it is to be understood that each of the groups of cameras can be directed in any direction, and that some of the groups of cameras may be directed in the same direction and mounted to different locations on the aircraft in other embodiments.

Figure 4:
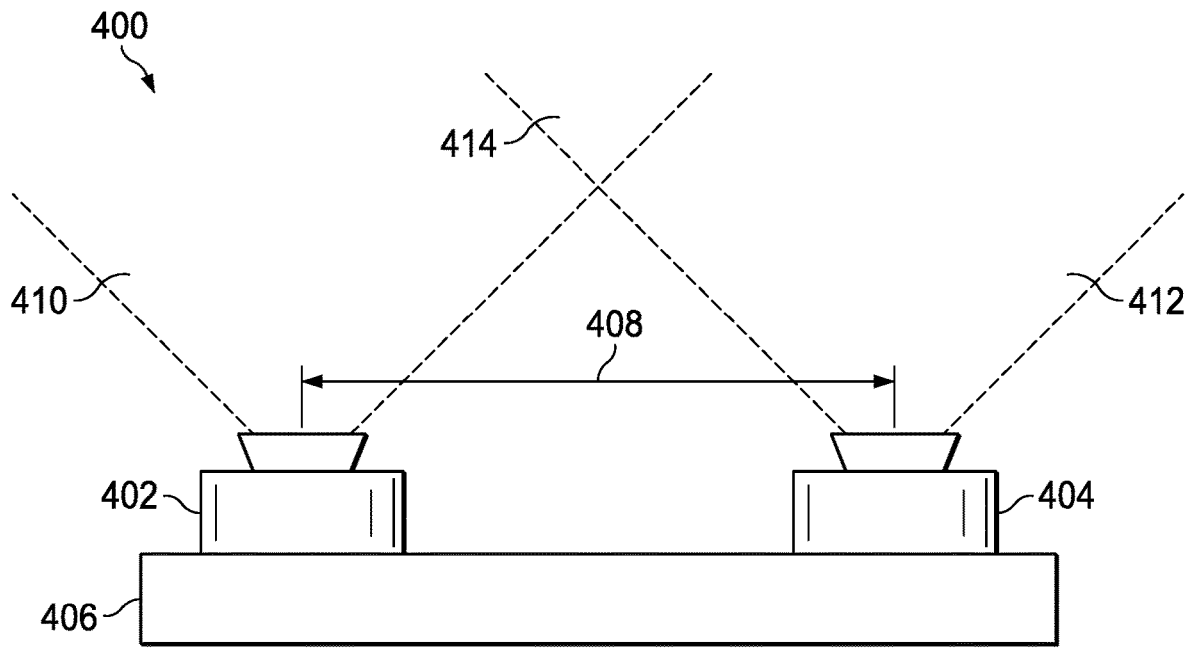
FIG. 4 is a top view of an example group of cameras in accordance with embodiments described herein.

FIG. 4 is a top view of an example group of cameras 400 in accordance with embodiments described herein. The group of cameras 400 may be implemented as any of the group of cameras attached to an aircraft, such as the groups of cameras described in relation to the aircraft 300 (FIG. 3). In particular, the first group of cameras 304, the second group of cameras 306, the third group of cameras 308, and the fourth group of cameras 310 may include one or more of the features of the group of cameras 400.

The group of cameras 400 may include two or more cameras. In the illustrated embodiment, the group of cameras 400 includes a first camera 402 and a second camera 404. Where the group of cameras 400 has two cameras as is illustrated, the group of cameras 400 may be referred to as a pair of cameras. The first camera 402 and the second camera 404 may comprise stereoscopic cameras. In some embodiments, the stereoscopic cameras may comprise low-resolution stereoscopic cameras, night vision stereoscopic cameras, or low resolution, night vision stereoscopic cameras.

The group of cameras 400 may further include a mounting structure 406. The mounting structure 406 can be utilized for mounting the cameras in the group of cameras 400 to the body of an aircraft, such as the body 302 (FIG. 3) of the aircraft 300. In particular, the cameras can attach to the mounting structure 406 and the mounting structure 406 can attach to the body of the aircraft. In other embodiments, the mounting structure 406 may be omitted and each camera in the group of cameras 400 can be mounted directly to the body of the aircraft.

Each camera within the group of cameras 400 may be offset from other cameras within the group of cameras 400 by some distance. In the illustrated embodiment, the first camera 402 and the second camera 404 are offset by a distance 408. The distance between each of the cameras within the group of cameras 400 may be the same or may vary in other embodiments.

Each camera within the group of cameras 400 has a portion of the field of view of the camera that overlaps with the field of view of at least one other camera within the group. In some embodiments, every camera within the group of cameras 400 has a portion of the field of view of the camera that overlaps with fields of view of every other camera within the group of cameras 400. In the illustrated embodiment, the first camera 402 has a field of view 410 and the second camera 404 has a field of view 412. A portion of the field of view 410 and a portion of the field of view 412 overlap, thereby producing an overlapping field of view 414. A portion of a surrounding environment within the overlapping field of view 414 may appear in both images captured by the first camera 402 and images captured by the second camera 404.

Figure 5:
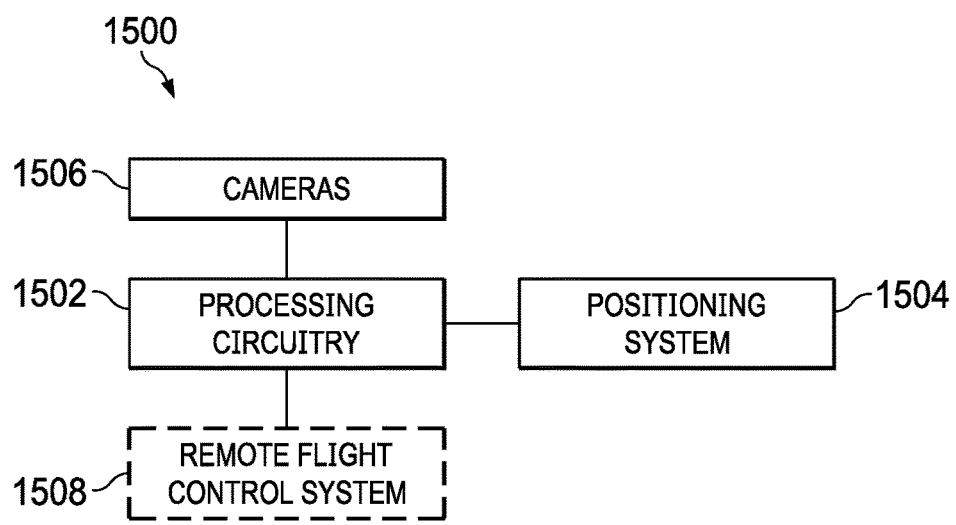
FIG. 5 is a block diagram of an example navigation system for an aircraft in accordance with embodiments described herein.
Figure 12:
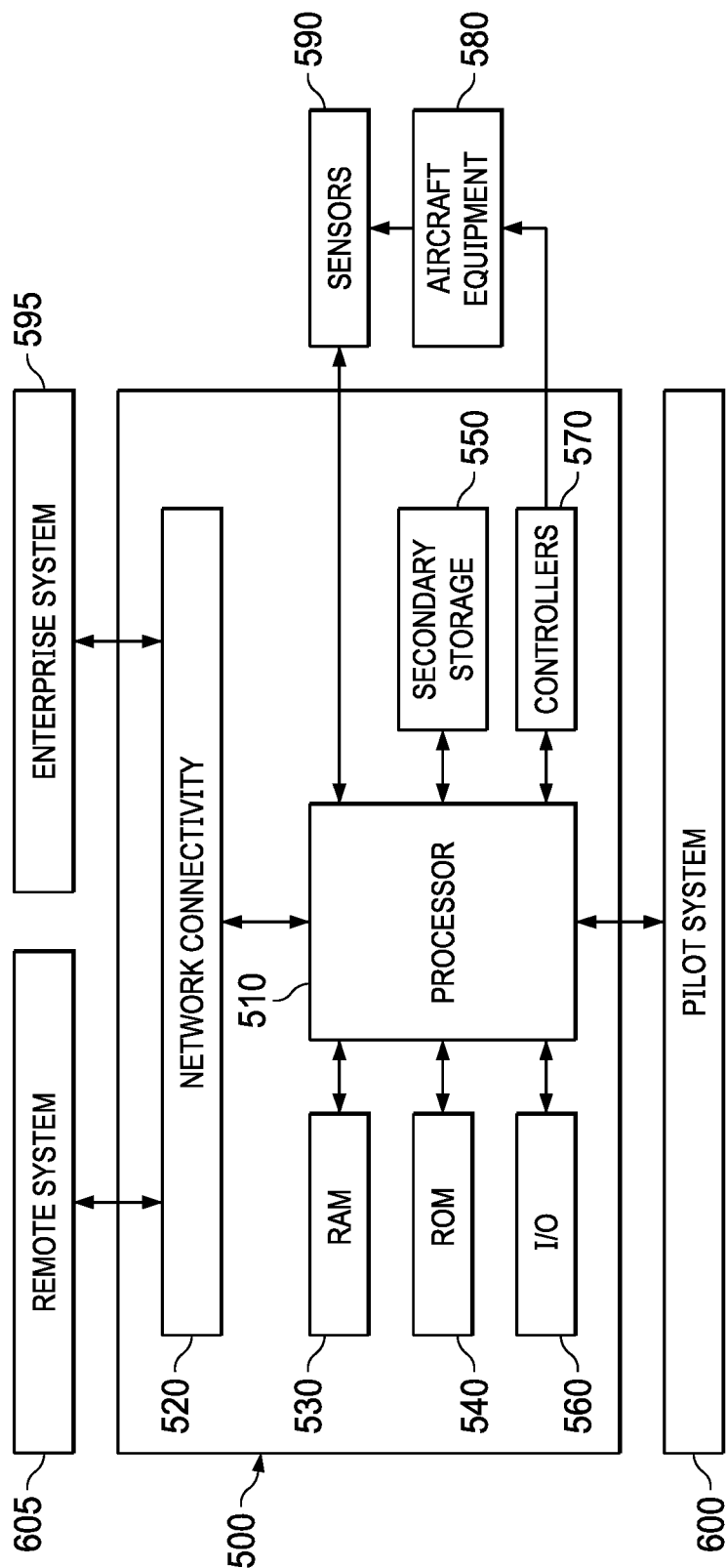
FIG. 12 is a schematic diagram of a general-purpose processor (e.g. electronic controller or computer) system suitable for implementing the embodiments of this disclosure.

FIG. 5 is a block diagram of an example navigation system 1500 for an aircraft in accordance with embodiments described herein. The navigation system 1500 may be implemented in the aircraft 100 (FIG. 1) and/or the aircraft 300 (FIG. 3). The navigation system 1500 illustrated may be implemented as a portion of another system or systems, such as the general-purpose processor system 500 (FIG. 12), the pilot system 600 (FIG. 12), the remote system 605 (FIG. 12), the sensors 590 (FIG. 12), and/or the aircraft equipment 580 (FIG. 12). For example, one or more of the components, or the features thereof, may be implemented by components in another system or systems.

The navigation system 1500 includes a processing component 1502. The processing component 1502 may include one or more processors and circuitry to perform operations. The processing component 1502 can analyze information received to determine a location of the aircraft, determine a change in a location of the aircraft, and/or produce data that can be utilized for determining a location of the aircraft. In some embodiments, the processing component 1502 can be implemented by the processing component 510 (FIG. 12).

The navigation system 1500 further includes a positioning system 1504. The positioning system 1504 may be wire coupled or wirelessly coupled to the processing component 1502. The positioning system 1504 can produce information that can be utilized to determine a location of the aircraft. In some embodiments, the positioning system 1504 may comprise a global positioning system (GPS), an inertial navigation system, an optimized method for estimated guidance accuracy very low frequency navigation system (OMEGA), a long range navigation (revision c) (LORAN-C) system, a very high frequency omni-directional range (VOR) system, a Decca navigation system, a non-directional beacon (NDB) system, or some combination thereof. The positioning system 1504 can provide information to the processing component 1502 to determine a location of the aircraft.

The navigation system 1500 further includes a plurality of cameras 1506. The plurality of cameras 1506 may be coupled to the processing component 1502. The cameras 1506 may include one or more groups of cameras, such as the first group of cameras 304 (FIG. 3), the second group of cameras 306 (FIG. 3), the third group of cameras 308 (FIG. 3), and the fourth group of cameras 310 (FIG. 3). In particular, each camera of the plurality of cameras 1506 can include one or more of the features of the cameras in the group of cameras described in relation to the aircraft 300 (FIG. 3) and/or the group of cameras 400 (FIG. 4). Further, the plurality of cameras can be segmented into groups of cameras, where each camera in a group of cameras has a field of view that overlaps with the field of view with at least one other camera in the group. In some embodiments, the plurality of cameras 1506 can be implemented as part of the sensors 590 (FIG. 12).

The processing component 1502 may control operation of the plurality of cameras 1506 and may retrieve data from the plurality of cameras. For example, the processing component 1502 can cause each camera within a group of cameras of the plurality of cameras to capture images simultaneously. Further, the processing component 1502 can cause all the groups of cameras of the plurality of cameras to capture images simultaneously or can stagger the times where each group of cameras capture images. The processing component 1502 can retrieve the captured images from the cameras and utilize the images to determine a current position of the aircraft on which the cameras are mounted, as described throughout this disclosure. The current position of the aircraft determined based on the images may supplement the information received from the positioning system 1504 for determining the position of the aircraft or may be utilized when one or more of the features of the positioning system 1504 are unavailable. For example, the one or more of the features of the positioning system 1504 may be unavailable when a wireless connection fails or an occurs with the one or more features of the positioning system 1504. The positioning system 1504 may provide an indication that one or more of the features of the positioning system 1504 are unavailable to the processing component 1502, which may cause the processing component 1502 to trigger one or more groups of the cameras 1506 to capture images and utilize the images to determine the current location of the aircraft.

The navigation system 1500 may further include a remote flight control system 1508 in some embodiments. The remote flight control system 1508 may be wirelessly coupled to the processing component 1502. The remote flight control system 1508 may store a current location of the aircraft and/or provide instructions to direct a flight plan of the aircraft. For example, the remote flight control system 1508 may receive information from the processing component 1502 that indicates the current location of the aircraft and store the current location of the aircraft. In some embodiments, the remote flight control system 1508 may receive the information that indicates the current position of the aircraft and determine the global location of the aircraft and/or the location of the aircraft on a map. Based on the current position of the aircraft, the global location of the aircraft, and/or the location of the aircraft on a map, the remote flight control system 1508 can determine a course on which the aircraft is to proceed and provide commands to the processing component 1502 to cause the aircraft to proceed along the course in some embodiments. In other embodiments, the remote flight control system 1508 may have a display that can display the current position of the aircraft, the global location of the aircraft, or the location of the aircraft on the map and a control input (such as a yoke, a control wheel, or other control input) that can receive an input and provide commands to the remote flight control system 1508 in accordance with the input. In other embodiments, the remote flight control system 1508 may be omitted and the processing component 1502 may perform the operations described in relation to the remote flight control system 1508.

Figure 6:
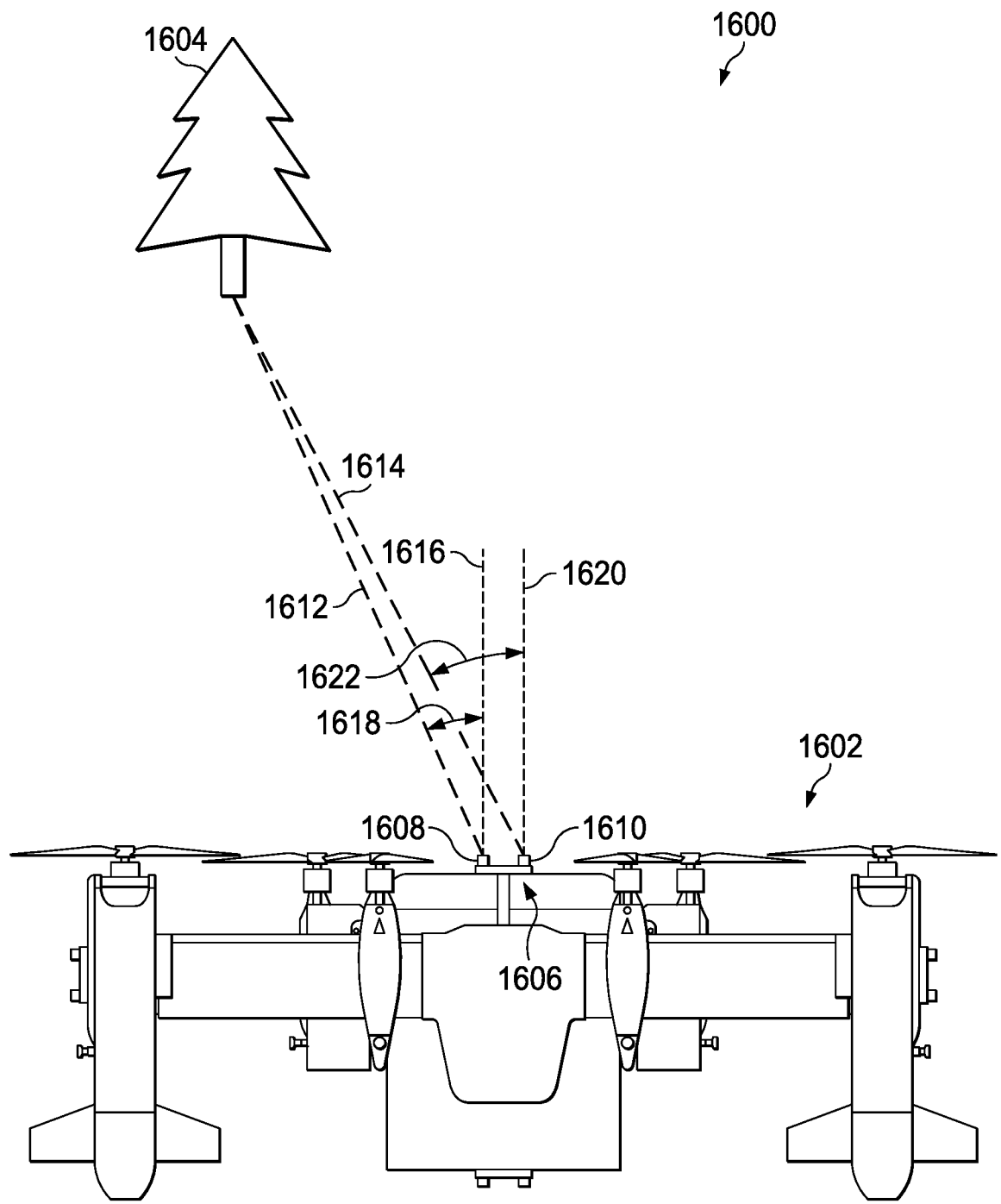
FIG. 6 is a diagram of an example aircraft flight arrangement in accordance with embodiments described herein.

FIG. 6 is a diagram of an example aircraft flight arrangement 1600 in accordance with embodiments described herein. In particular, the aircraft flight arrangement 1600 illustrates an aircraft 1602 and an object 1604. The aircraft 1602 may include one or more of the features of the aircraft 100 (FIG. 1) and/or the aircraft 300 (FIG. 3). Further, the aircraft can include a navigation system, such as the navigation system 1500 (FIG. 5). In some embodiments, the object 1604 can be any object in an environment surrounding the aircraft 1602, such as a tree, a mountain, or other environmental marker. The aircraft 1602 may be flying over the environment, including the object 1604, in the aircraft flight arrangement 1600.

The aircraft 1602 includes a group of cameras 1606 mounted to a front of the aircraft 1602. In the illustrated embodiment, the group of cameras 1606 includes a first camera 1608 and a second camera 1610. The first camera 1608 and the second camera 1610 may be offset from each other, where a portion of the fields of view the first camera 1608 and the second camera 1610 overlap and both the first camera 1608 and the second camera 1610 capture a portion of the environment surrounding the aircraft 1602 in the respective images captured by the first camera 1608 and the second camera 1610. The object 1604 may be located in the portion of the environment captured in the images of the first camera 1608 and the second camera 1610.

The first camera 1608 and the second camera 1610 can determine distances to objects captured to objects captured in the images. For example, the first camera 1608 can determine a first distance 1612 between the first camera 1608 and the object 1604. Further, the second camera 1610 can determine a second distance 1614 between the second camera 1610 and the object 1604. The images captured by the first camera 1608 and the second camera 1610 can include data that indicates the distances between the objects and the cameras. In particular, the image captured by the first camera 1608 can include data that indicates the first distance 1612 and the image captured by the second camera 1610 can include data that indicates the second distance 1614.

The images captured by the first camera 1608 and the second camera 1610 can further indicate angles of objects captured in the images relative to each camera. For example, the first camera 1608 has a center of view 1616, the center of view 1616 being the center of the field of view of the first camera 1608. The image captured by the first camera 1608 can indicate an angle 1618 between the object 1604 and the center of view 1616, where the angle 1618 can be indicated by an offset of the object 1604 from the center of the image captured by the first camera 1608. The second camera 1610 has a center of view 1620, the center of view 1620 being the center of the field of view of the second camera 1610. The image captured by the second camera 1610 can indicate an angle 1622 between the object 1604 and the center of view 1620, where the angle 1622 can be indicated by an offset of the object 1604 from the center of the image captured by the second camera 1610.

Figure 7:
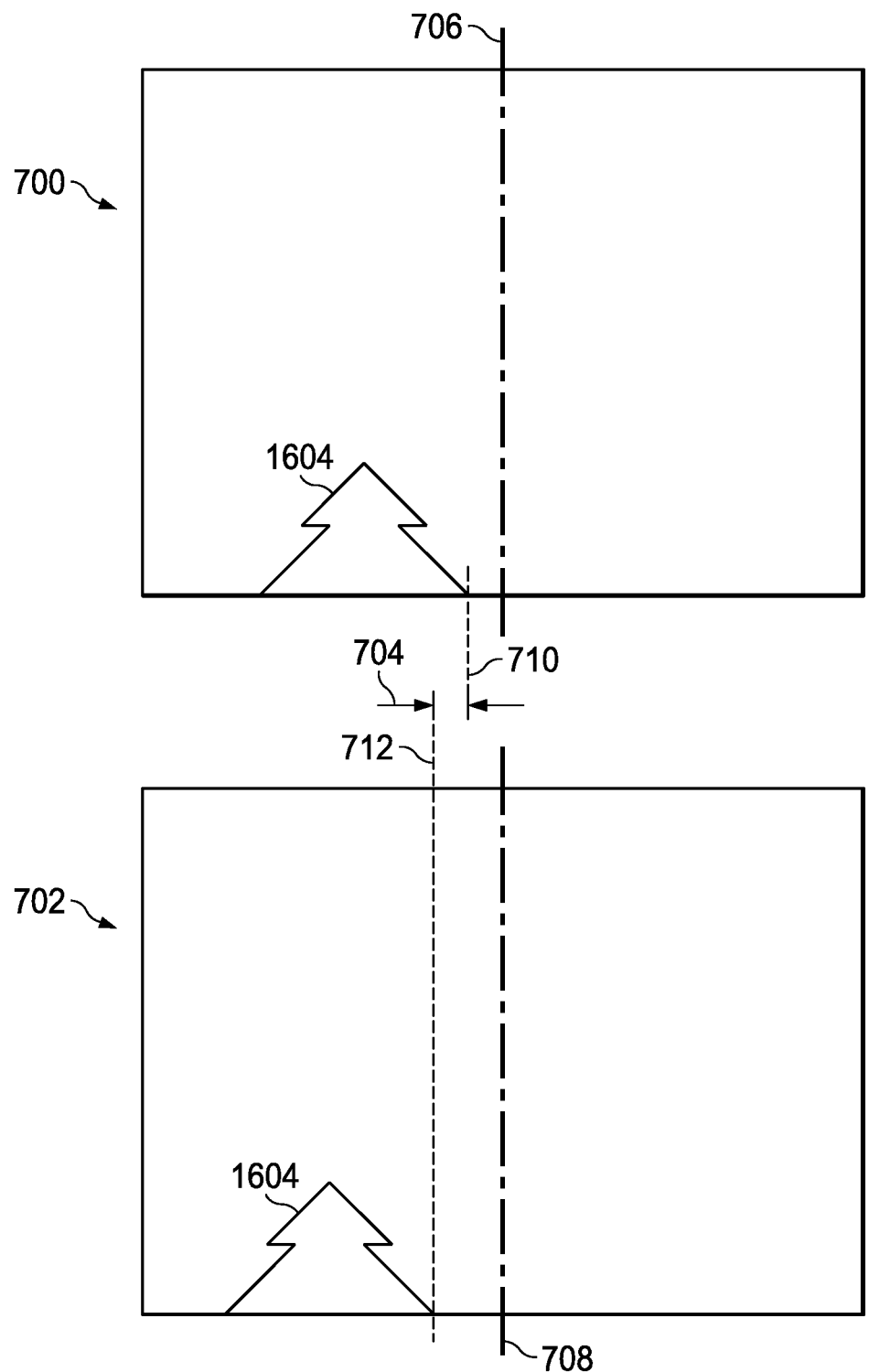
FIG. 7 is a diagram of example images that can be captured in the aircraft flight arrangement of FIG. 6 in accordance with embodiments described herein.

FIG. 7 is a diagram of example images that can be captured in the aircraft flight arrangement 1600 of FIG. 6 in accordance with embodiments described herein. In particular, FIG. 7 illustrates a first image 700 that may be captured by the first camera 1608 (FIG. 6) and a second image 702 that may be captured by the second camera 1610 (FIG. 6) when the aircraft 1602 is in the aircraft flight arrangement 1600. It is to be understood that the images illustrated are simplified images to illustrate the features described herein.

The first image 700 can capture a portion of the object 1604 located within a field of view of the first camera 1608. In the illustrated embodiment, the object 1604 illustrated can be a tree with a top of the tree being the portion of the object 1604 within the field of view of the first camera 1608. In other embodiments, the object 1604 can be any other object, such as a landmark. As can be seen in the first image 700, the object 1604 is offset from a center of the first image 700. The offset can indicate the angle 1618 of the object 1604 relative to the first camera 1608, and the angle 1618 can be derived based on the offset. The first image 700 can further include embedded data indicating distances to objects captured in the first image 700, such as the portion of the object 1604. For example, the first image 700 can include data indicating the first distance 1612 (FIG. 6) associated with the object 1604 as captured in the first image 700.

The second image 702 can also capture a portion of the object 1604. In some embodiments, the portion of the object 1604 can be the same portion of the object 1604 captured from a different angle based on the offset between the first camera 1608 and the second camera 1610. For example, the portion of the object 1604 captured by the second camera 1610 is the top of the tree, which is also within the field of view of the second camera 1610. As can be seen in the second image 702, the object 1604 is offset from a center of the second image 702. The offset can indicate the angle 1622 of the object 1604 relative to the second camera 1610, and the angle 1622 can be derived based on the offset. The locations of the object 1604 captured in the first image 700 and the object 1604 in the second image 702 may be offset, referred to as difference offset 704, due to the offset of the first camera 1608 and the second camera 1610. The second image 702 can further include embedded data indicating distances to objects captured in the second image 702, such as the portion of the object 1604. For example, the second image 702 can include data indicating the second distance 1614 (FIG. 5) associated with the object 1604 as captured in the second image 702.

The first image 700 and the second image 702 can be retrieved by a processing component (such as the processing component 1502 (FIG. 5)) and utilized by the processing component for determining a current position of the aircraft 1602. For example, the processing component can analyze the first image 700 and the second image 702 to identify the object 1604 captured in each of the images. The processing component can perform image processing on each of the first image 700 and the second image 702. From the image processing, the processing component can identify in the first image 700 objects that the processing component determines could be fixed and/or utilized for determining a position of the aircraft 1602. Further, the processing component can identify in the second image 702 objects that the processing component determines could be fixed and/or utilized for determining a position of the aircraft 1602. The processing component can compare the objects identified in the first image 700 with the objects identified in the second image 702 to determine which, and/or if any, of the identified objects are captured in both the first image 700 and the second image 702. The comparison can include comparing the colors, the shapes, and/or the relative locations of the objects in each of the images to identify one or more objects that appear in both the first image 700 and the second image 702. The processing component can utilize any of the identified objects captured in both the first image 700 and the second image 702 to determine a position of the aircraft 1602 relative to the objects. In the illustrated embodiment, the processing component can determine that the object 1604 is captured in both the first image 700 and the second image 702, and can utilize the object 1604 to determine the position of the aircraft relative to the object 1604.

The processing component can utilize the data of the first image 700 and the second image 702 to determine the distances between the first camera 1608 and the object 1604, and between the second camera 1610 and the object 1604. In particular, the processing component can identify data indicating the first distance 1612 to the object 1604 in the first image 700 and identify data indicating the second distance 1614 to the object 1604 in the second image 702. Further, based on the positions of the object 1604 in the first image 700 and the second image 702, the processing component can determine the angle 1618 of the object 1604 relative to the first camera 1608 and the angle 1622 of the object 1604 relative to the second camera 1610. For example, the processing component can determine angles to objects based on the position of the objects in the images relative to center points of the images or center lines of the images. In the illustrated embodiment, the first image 700 has center line 706 that bisects the first image 700 and the second image 702 has center line 708 that bisects the second image 702. The processing component can identify one or more points of the objects in the image and determine a distance between the one or more points and the center line of the image. For example, the processing device can identify a point (indicated by line 710) of the object 1604 closest to the center line 706 in the first image 700 and a point (indicated by line 712) of the object closest to the center line 708 in the second image 702. In some embodiments, the point identified in the first image 700 and the point identified in the second image 702 may both correspond to a same point on the object 1604. The processing component can determine the distance between line 710 and the center line 706, and can determine the distance between the line 712 and the center line 708. Based on the distance between the line 710 and the center line 706 and the distance to the object 1604 in the first image 700, the processing component can determine the angle 1618 of the object 1604 relative to the first camera 1608. Based on the distance between the line 712 and the center line 708 and the distance to the object 1604 in the second image 702, the processing component can determine the angle 1622 of the object 1604 relative to the second camera 1610.

The processing component can determine the position of the object 1604 relative to the aircraft 1602 from the first image 700 based on the angle 1618, the first distance 1612, and/or the position of the first camera 1608 on the aircraft 1602. The processing component can determine the position of the object 1604 relative to the aircraft 1602 from the second image 702 based on the angle 1622, the second distance 1614, and/or the position of the second camera 1610 on the aircraft 1602. The processing component can compare the position of the object 1604 determined from the first image 700 to the position of the object 1604 determined from the second image 702 to verify that the determined position of the object 1604 relative to the aircraft 1602 was determined correctly. If a difference between the position of the object 1604 relative to the aircraft 1602 determined based on the first image 700 and the position of the object 1604 relative to the aircraft 1602 determined based on the second image 702 exceeds a threshold variance (such as a 5% variance), the processing component may determine that the relative position of the object 1604 relative to the aircraft 1602 was improperly determined and will attempt to utilize another object to determine the position of the aircraft. If the difference between the position of the object 1604 relative to the aircraft 1602 determined based on the first image 700 and the position of the object 1604 relative to the aircraft 1602 determined based on the second image 702 is less than the threshold variance, the processing component can determine that the position was properly determined and utilize the relative position to determine the position of the aircraft 1602. In instances where the object 1604 is a landmark, the position of the aircraft 1602 can be utilized to determine a global position or a location on a map of the aircraft 1602 based on a known location of the landmark in some embodiments. The determined position can be utilized as a reference position utilized with subsequent determinations of positions of the aircraft 1602 and/or previous determinations of the positions of the aircraft 1602 to determine a global position or a location on a map of the aircraft 1602, as described further throughout this disclosure.

Figure 8:
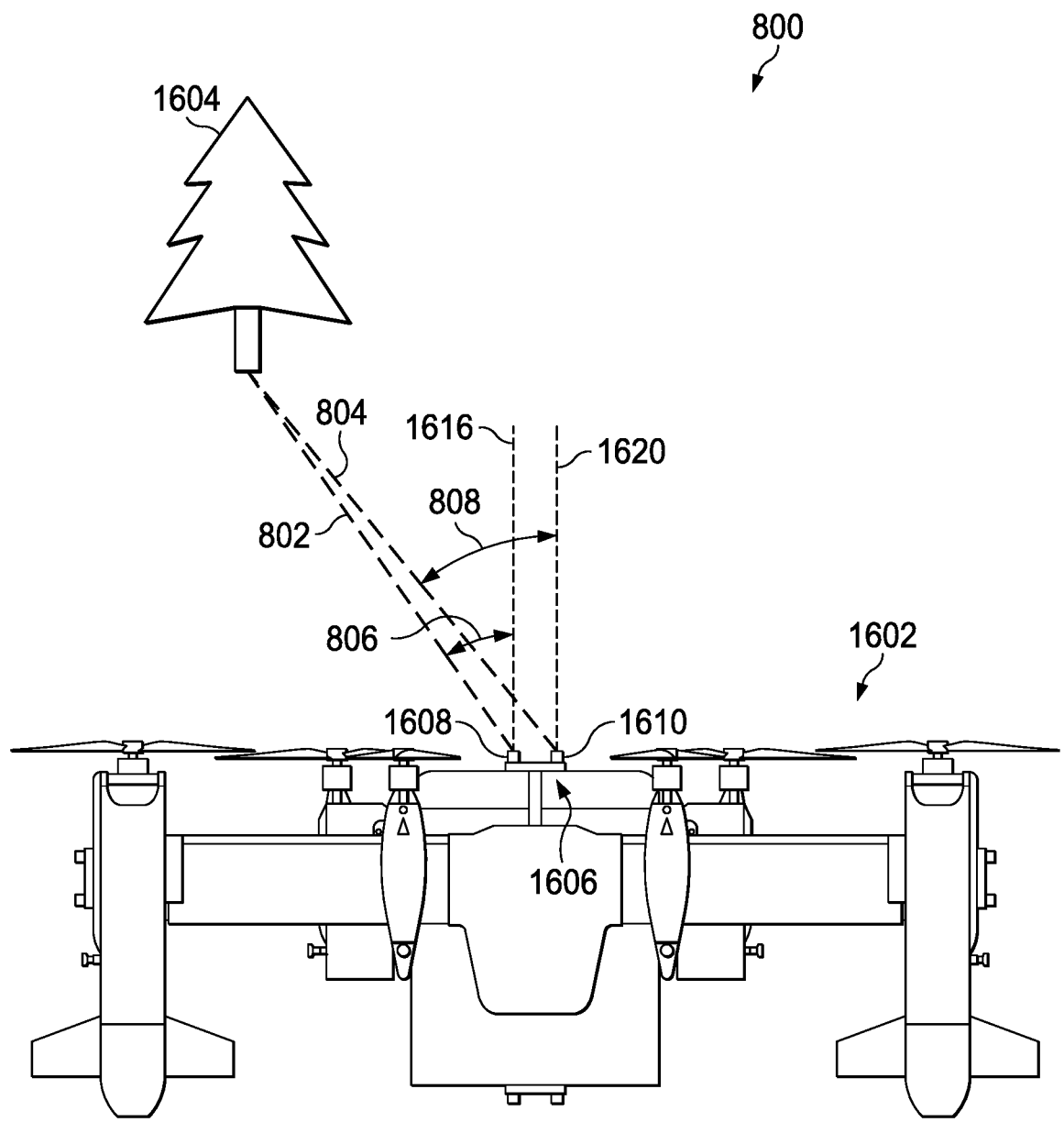
FIG. 8 is a diagram of another example aircraft flight arrangement in accordance with embodiments described herein.

FIG. 8 is a diagram of another example aircraft flight arrangement 800 in accordance with embodiments described herein. The aircraft flight arrangement 800 can occur subsequent in time to the aircraft flight arrangement 1600 (FIG. 6).

The aircraft flight arrangement 800 illustrates the aircraft 1602 and the object 1604. Due to movement of the aircraft 1602 since the aircraft flight arrangement 1600, the aircraft 1602 is located closer to the object 1604 in the aircraft flight arrangement 800. In particular, the aircraft 1602 traveled in a forward direction from the aircraft flight arrangement 1600 to the aircraft flight arrangement 800, where the object 1604 is located in front of the aircraft 1602.

The first camera 1608 can determine a first distance 802 between the first camera 1608 and the object 1604. Further, the second camera 1610 can determine a second distance 804 between the second camera 1610 and the object 1604. The images captured by the first camera 1608 and the second camera 1610 can include data that indicates the distances between the objects and the cameras. In particular, the image captured by the first camera 1608 can include data that indicates the first distance 802 and the image captured by the second camera 1610 can include data that indicates the second distance 804.

The images captured by the first camera 1608 and the second camera 1610 can further indicate angles of objects captured in the images relative to each camera. For example, the first camera 1608 has a center of view 1616, the center of view 1616 being the center of the field of view of the first camera 1608. The image captured by the first camera 1608 can indicate an angle 806 between the object 1604 and the center of view 1616, where the angle 806 can be indicated by an offset of the object 1604 from the center of the image captured by the first camera 1608. The second camera 1610 has a center of view 1620, the center of view 1620 being the center of the field of view of the second camera 1610. The image captured by the second camera 1610 can indicate an angle 808 between the object 1604 and the center of view 1620, where the angle 808 can be indicated by an offset of the object 1604 from the center of the image captured by the second camera 1610.

Figure 9:
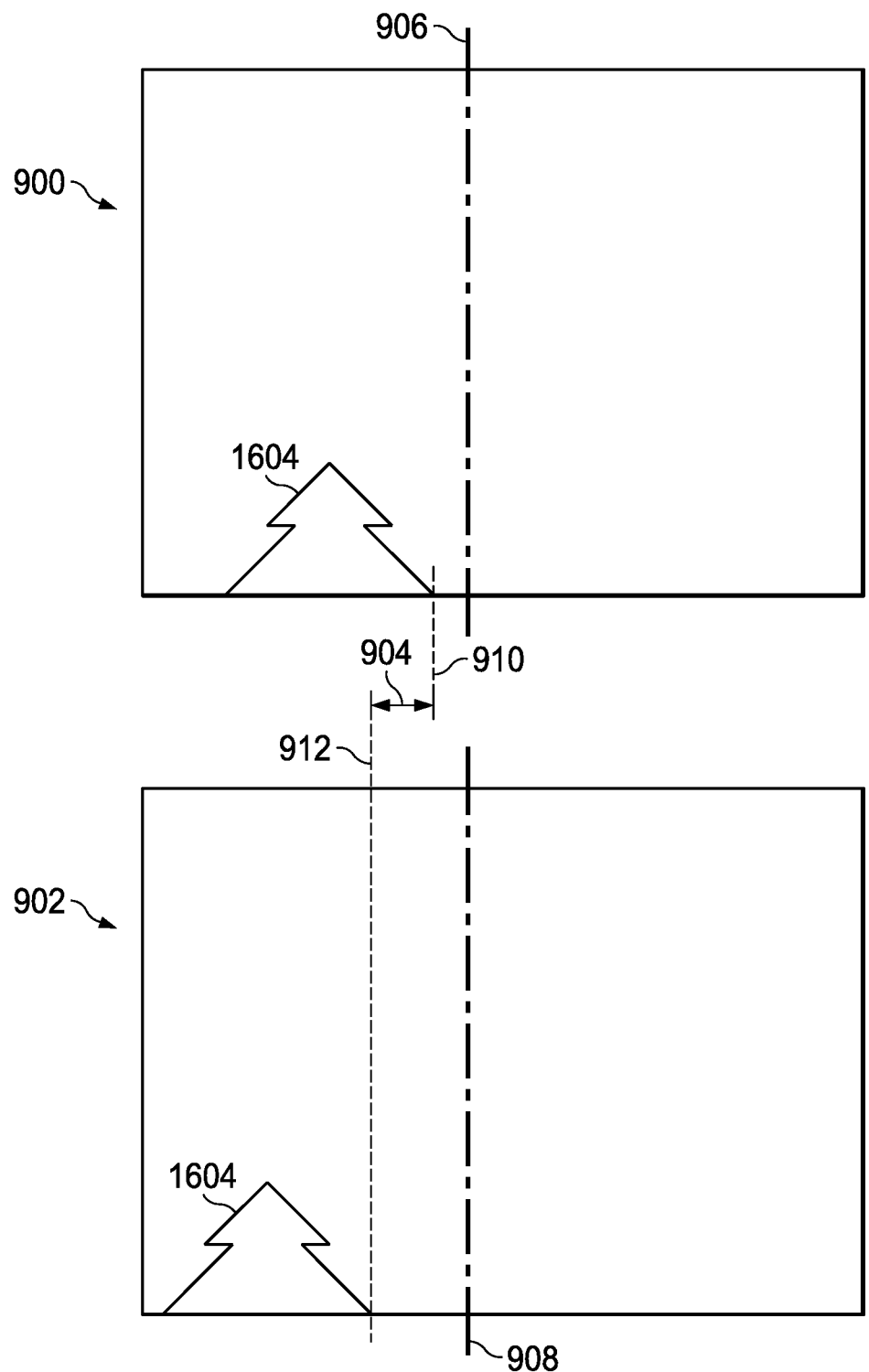
FIG. 9 is a diagram of example images that can be captured in the aircraft flight arrangement of FIG. 8 in accordance with embodiments described herein.

FIG. 9 is a diagram of example images that can be captured in the aircraft flight arrangement 800 of FIG. 8 in accordance with embodiments described herein. In particular, FIG. 9 illustrates a first image 900 that may be captured by the first camera 1608 (FIG. 6) and a second image 902 that may be captured by the second camera 1610 (FIG. 6) when the aircraft 1602 is in the aircraft flight arrangement 1600. It is to be understood that the images illustrated are simplified images to illustrate the features described herein.

The first image 900 can capture a portion of the object 1604 located within a field of view of the first camera 1608. In the illustrated embodiment, the object 1604 illustrated can be a tree with a top of the tree being the portion of the object 1604 within the field of view of the first camera 1608. In other embodiments, the object 1604 can be any other object, such as a landmark. As can be seen in the first image 900, the object 1604 is offset from a center of the first image 900. The offset can indicate the angle 806 of the object 1604 relative to the first camera 1608, and the angle 806 can be derived based on the offset. The first image 900 can further include embedded data indicating distances to objects captured in the first image 900, such as the portion of the object 1604. For example, the first image 900 can include data indicating the first distance 802 (FIG. 8) associated with the object 1604 as captured in the first image 900.

The second image 902 can also capture a portion of the object 1604. In some embodiments, the portion of the object 1604 can be the same portion of the object 1604 captured from a different angle based on the offset between the first camera 1608 and the second camera 1610. For example, the portion of the object 1604 captured by the second camera 1610 is the top of the tree, which is also within the field of view of the second camera 1610. As can be seen in the second image 902, the object 1604 is offset from a center of the second image 902. The offset can indicate the angle 808 of the object 1604 relative to the second camera 1610, and the angle 808 can be derived based on the offset. The locations of the object 1604 captured in the first image 900 and the object 1604 in the second image 902 may be offset, referred to as difference offset 904, due to the offset of the first camera 1608 and the second camera 1610. The difference offset 904 is greater than the difference offset 704 (FIG. 7) due to the change of the position of the aircraft 1602. The second image 902 can further include embedded data indicating distances to objects captured in the second image 902, such as the portion of the object 1604. For example, the second image 902 can include data indicating the second distance 1614 (FIG. 5) associated with the object 1604 as captured in the second image 902.

The first image 900 and the second image 902 can be retrieved by a processing component (such as the processing component 1502 (FIG. 5)) and utilized by the processing component for determining a current location of the aircraft 1602. For example, the processing component can analyze the first image 900 and the second image 902 to identify the object 1604 captured in each of the images. The processing component can perform image processing on each of the first image 900 and the second image 902. From the image processing, the processing component can identify in the first image 900 objects that the processing component determines could be fixed and/or utilized for determining a position of the aircraft 1602. Further, the processing component can identify in the second image 902 objects that the processing component determines could be fixed and/or utilized for determining a position of the aircraft 1602. The processing component can compare the objects identified in the first image 900 with the objects identified in the second image 902 to determine which, and/or if any, of the identified objects are captured in both the first image 900 and the second image 902. The comparison can include comparing the colors, the shapes, and/or the relative locations of the objects in each of the images to identify one or more objects that appear in both the first image 900 and the second image 902. The processing component can utilize any of the identified objects captured in both the first image 900 and the second image 902 to determine a position of the aircraft 1602 relative to the objects. In the illustrated embodiment, the processing component can determine that the object 1604 is captured in both the first image 900 and the second image 902, and can utilize the object 1604 to determine the position of the aircraft relative to the object 1604.

The processing component can utilize the data of the first image 900 and the second image 902 to determine the distances between the first camera 1608 and the object 1604, and between the second camera 1610 and the object 1604. In particular, the processing component can identify data indicating the first distance 802 to the object 1604 in the first image 900 and identify data indicating the second distance 804 to the object 1604 in the second image 902. Further, based on the positions of the object 1604 in the first image 900 and the second image 902, the processing component can determine the angle 806 of the object 1604 relative to the first camera 1608 and the angle 808 of the object 1604 relative to the second camera 1610. For example, the processing component can determine angles to objects based on the position of the objects in the images relative to center points of the images or center lines of the images. In the illustrated embodiment, the first image 900 has center line 906 that bisects the first image 900 and the second image 902 has center line 908 that bisects the second image 902.

The processing component can identify one or more points of the objects in the image and determine a distance between the one or more points and the center line of the image. For example, the processing device can identify a point (indicated by line 910) of the object 1604 closest to the center line 906 in the first image 900 and a point (indicated by line 912) of the object closest to the center line 908 in the second image 902. In some embodiments, the point identified in the first image 900 and the point identified in the second image 902 may both correspond to a same point the object 1604. The processing component can determine the distance between line 910 and the center line 906, and can determine the distance between the line 912 and the center line 908. Based on the distance between the line 910 and the center line 906 and the distance to the object 1604 in the first image 900, the processing component can determine the angle 806 of the object 1604 relative to the first camera 1608. Based on the distance between the line 912 and the center line 908 and the distance to the object 1604 in the second image 902, the processing component can determine the angle 808 of the object 1604 relative to the second camera 1610.

The processing component can determine the position of the object 1604 relative to the aircraft 1602 from the first image 900 based on the angle 806, the first distance 802, and/or the position of the first camera 1608 on the aircraft 1602. The processing component can determine the position of the object 1604 relative to the aircraft 1602 from the second image 902 based on the angle 808, the second distance 804, and/or the position of the second camera 1610 on the aircraft 1602. The processing component can compare the position of the object 1604 determined from the first image 900 to the position of the object 1604 determined from the second image 902 to verify that the determined position of the object 1604 relative to the aircraft 1602 was determined correctly. If a difference between the position of the object 1604 relative to the aircraft 1602 determined based on the first image 900 and the position of the object 1604 relative to the aircraft 1602 determined based on the second image 902 exceeds a threshold variance (such as a 5% variance), the processing component may determine that the relative position of the object 1604 relative to the aircraft 1602 was improperly determined and will attempt to utilize another object to determine the position of the aircraft. If the difference between the position of the object 1604 relative to the aircraft 1602 determined based on the first image 900 and the position of the object 1604 relative to the aircraft 1602 determined based on the second image 902 is less than the threshold variance, the processing component can determine that the position was properly determined and utilize the relative position to determine the location of the aircraft 1602. In instances where the object 1604 is a landmark, the position of the aircraft 1602 can be utilized to determine a global position or a location on a map of the aircraft 1602 based on a known location of the landmark in some embodiments.

The determined position can be utilized as a reference position utilized with subsequent determinations of locations of the aircraft 1602 and/or previous determinations of locations of the aircraft 1602 to determine a global location or a location on a map of the aircraft 1602, as described further throughout this disclosure. For example, the processing component can compare the determined position of the aircraft 1602 relative to the object 1604 in the aircraft flight arrangement 1600 to the determined position of the aircraft 1602 relative to the object 1604 in the aircraft flight arrangement 800. Based on the comparison, the processing component can determine a change in the position of aircraft 1602 between the aircraft flight arrangement 1600 and the aircraft flight arrangement 800. Assuming the global location or the location on a map of the aircraft 1602 at the time of the aircraft flight arrangement 1600, the processing component can utilize the determined change in the position of the aircraft 1602 to determine the global location or the location on the map of the aircraft 1602 at the time of the aircraft flight arrangement 800. Further, the processing component can update the currently stored global location or location on the map of the aircraft 1602 based on the determined global location or the location on the map of the aircraft 1602 at the time of the aircraft flight arrangement 800.

Figure 10:
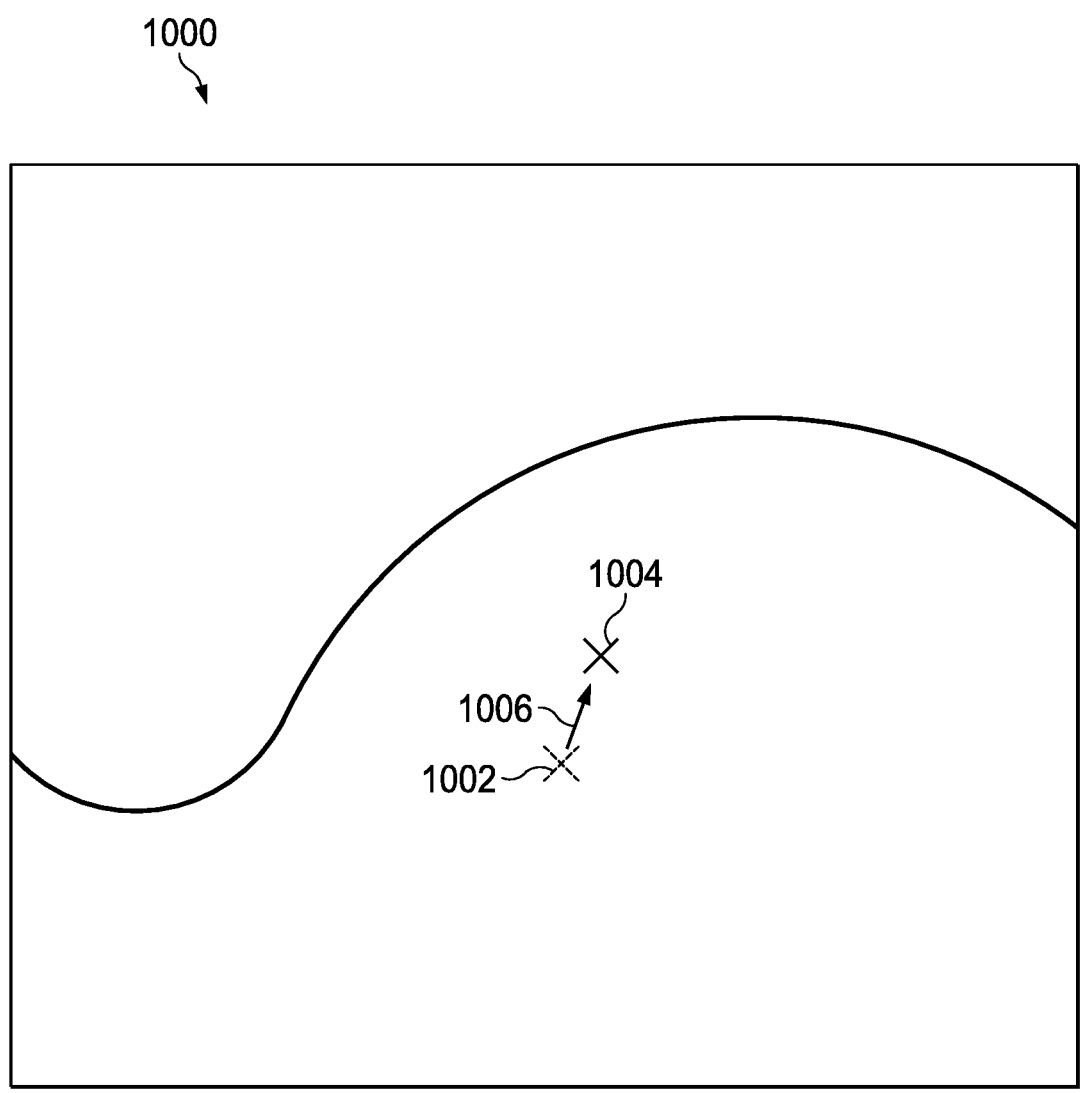
FIG. 10 is a diagram of an example navigation map in accordance with embodiments described herein.

FIG. 10 is a diagram of an example navigation map 1000 in accordance with embodiments described herein. In particular, the navigation map 1000 illustrates an example update of the map that may be implemented based on the determined change in position of the aircraft 1602 (FIG. 6) from the aircraft flight arrangement 1600 and the aircraft flight arrangement 800.

The navigation map 1000 includes a first mark 1002 (indicated by a dotted 'X') indicating where an aircraft could have been previously located. For example, the first mark 1002 can indicate a location on the navigation map 1000 where the aircraft 1602 was located at the time of the aircraft flight arrangement 1600 (FIG. 6). The location indicated by the first mark 1002 may have been previously stored and could be utilized as a reference position for determining a subsequent location of the aircraft.

The navigation map 1000 further includes a second mark 1004 (indicated by a solid 'X') indicating a current location of the aircraft. For example, the second mark 1004 can indicate a location on the navigation map 1000 where the aircraft 1602 is located at the time of the aircraft flight arrangement 800 (FIG. 8). The location of the second mark 1004 may have been determined based on the location indicated by the first mark 1002. In particular, a change in the position (indicated by arrow 1006) of the aircraft between location indicated by the first mark 1002 and the location indicated by the second mark 1004. For example, the change in position of the aircraft 1602 determined between the aircraft flight arrangement 1600 and the aircraft flight arrangement 800 can be utilized for determining the location of the second mark 1004 by applying the change in the position to the first mark 1002. The location indicated by the second mark 1004 can be stored and can be utilized as a reference position for determining subsequent locations of the aircraft.

Figure 11:
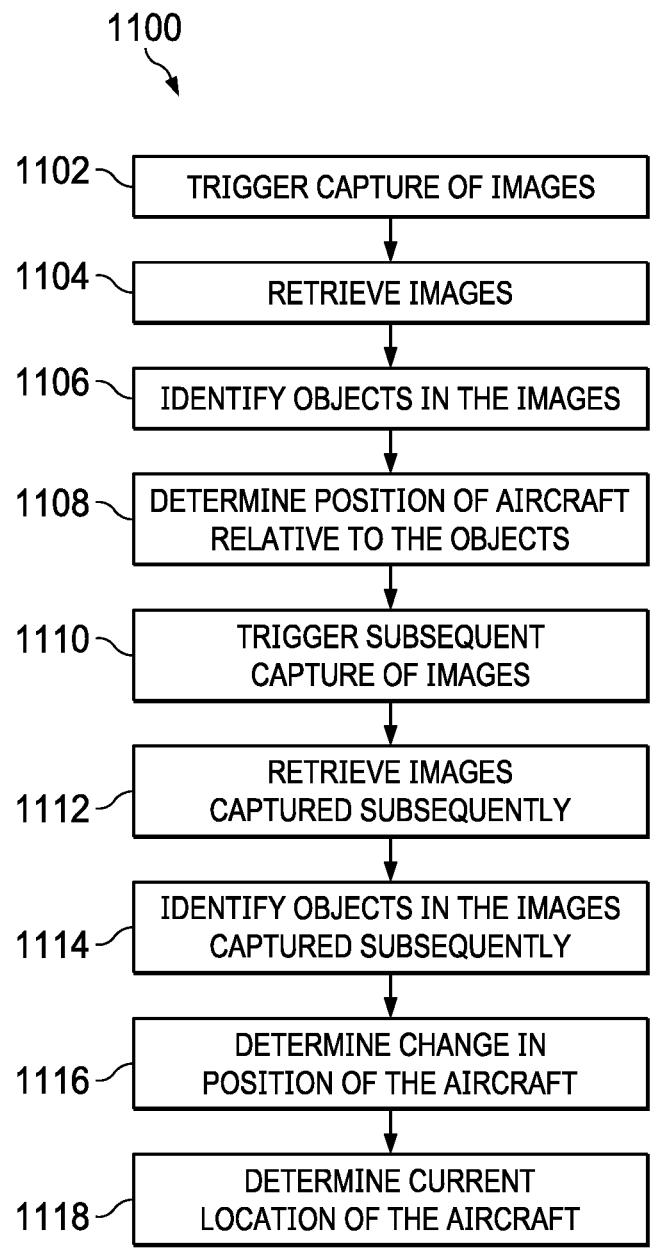
FIG. 11 is an example procedure for determining a current location of an aircraft in accordance with embodiments described herein.

FIG. 11 is an example procedure 1100 for determining a current location of an aircraft in accordance with embodiments described herein. In particular, the procedure 1100 can be implemented by an aircraft having one or more groups of cameras, such as the aircraft 300 (FIG. 3) and/or the aircraft 1602 (FIG. 6). One or more components (such as a processing component) of a navigation system of the aircraft can implement the procedure 1100.

The procedure 1100 may initiate with stage 1102. In stage 1102, a capture of images by one or more groups of cameras (such as the first group of cameras 304 (FIG. 3), the second group of cameras 306 (FIG. 3), the third group of cameras 308 (FIG. 3), the fourth group of cameras 310 (FIG. 3), the group of cameras 400 (FIG. 4), and/or the group of cameras 1606 (FIG. 6)) may be triggered. In some embodiments, the capture of the images may be initiated in response to a detection that one or more other positioning systems (such as a GPS) of the aircraft being able to determine a current location of the aircraft. The procedure 1100 may proceed from stage 1102 to stage 1104.

In stage 1104, the images captured by the one or more groups of cameras in stage 1102 may be retrieved. For example, the images may be retrieved from the cameras by a processing component (such as the processing component 1502 (FIG. 5)). The procedure 1100 may proceed from stage 1104 to stage 1106.

In stage 1106, one or more objects in the images may be identified. In particular, image processing may be performed on the images to identify one or more objects within the images. Further, one or more objects identified within an image captured by a camera can be compared with one or more objects identified within one or more images captured by one or more cameras within the same group of cameras to identify one or more objects that appear in multiple images captured by the group of cameras. The procedure 1100 may proceed from stage 1106 to stage 1108.

In stage 1108, a position of the aircraft relative to the one or more objects may be determined. For example, the distance and/or angles to the one or more objects may be determined, and the distance and/or angles can be utilized to determine the position of the aircraft relative to the one or more objects. The procedure 1100 may proceed from stage 1108 to stage 1110.

In stage 1110, another capture of images by the one or more groups of cameras can be subsequently triggered. In particular, the capture of the images can be triggered subsequently in time to the capture of the images in stage 1102. The one or more groups of cameras may be the same one or more groups of cameras triggered in stage 1102. The aircraft may have moved position when the images are captured in stage 1110 from the position when the images were captured in stage 1102. The procedure 1100 may proceed from stage 1110 to stage 1112.

In stage 1112, the images captured by the one or more groups of cameras in stage 1110 may be retrieved. For example, the images may be retrieved from the cameras by the processing component. The procedure 1100 may proceed from stage 1112 to stage 1114.

In stage 1114, one or more objects in the images captured subsequently in stage 1110 may be identified. In particular, image processing may be performed on the images to identify one or more objects within the images. Further, one or more objects identified within an image captured by a camera can be compared with one or more objects identified within one or more images captured by one or more cameras within the same group of cameras to identify one or more objects that appear in multiple images captured by the group of cameras. The objects identified as appearing in multiple images captured in stage 1110 may be compared with the objects identified as appearing in multiple images captured in stage 1106 to identify objects that are captured in the images captured in both stage 1106 and stage 1110. The procedure 1100 may proceed from stage 1114 to stage 1116.

In stage 1116, a change in position of the aircraft between the time the images were captured in stage 1102 and the time the images were captured in stage 1110 may be determined. For example, a position of the aircraft at the time of the capture of the images in stage 1110 relative to the one or more objects captured in the images captured in both stage 1106 and stage 1110 may be determined. For example, the distance and/or angles to the one or more objects may be determined, and the distance and/or angles can be utilized to determine the position of the aircraft relative to the one or more objects at the time of the capture of the images in stage 1110. The determined position of the aircraft relative to the objects when the images were captured in stage 1102 can be compared to the determined position of the aircraft relative to the objects when the images were captured in stage 1110 to determine a change in position of the aircraft. The procedure 1100 may proceed from stage 1116 to stage 1118.

In stage 1118, a current location of the aircraft may be determined. In particular, a global location and/or a location of the aircraft on a map may be determined. A location of the aircraft at the time the images were captured in stage 1102 may have been stored, which can be referred to as a prior location of the aircraft. The change in position of the aircraft determined in stage 1116 can be applied to the prior location of the aircraft to determine the current location of the aircraft when the images were captured in stage 1112.

While the procedure 1100 is described in a possible order in some instances, it is to be understood that the order may be different in other instances. Further, two or more of the stages of the procedure 1100 may be performed concurrently in some instances.

Referring to FIG. 12, a schematic diagram of a general-purpose processor (e.g. electronic controller or computer) system 500 suitable for implementing the embodiments of this disclosure is shown. In particular, the navigation system 1500 (FIG. 5) may be implemented by the system 500. System 500 includes a processing component 510 suitable for implementing one or more embodiments disclosed herein. In addition to the processor 510 (which may be referred to as a central processor unit or CPU), the system 500 may include network connectivity devices 520, random-access memory ("RAM") 530, read only memory ("ROM") 540, secondary storage 550, and input/output (I/O) devices 560. System 500 may also comprise aircraft component controllers 570 for generating control signals to aircraft equipment 580 in accordance with the teachings of embodiments described herein. Sensors 590 (e.g., sensors 116, 118, 119, the first group of cameras 304 (FIG. 3), the second group of cameras 306 (FIG. 3), the third group of cameras 308 (FIG. 3), the fourth group of cameras (FIG. 3), the group of cameras 400 (FIG. 4), the cameras 1506 (FIG. 5), and the group of cameras 1606 (FIG. 6)) are also provided and provide sensor data to be processed by processor 510. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data and lookup tables described herein may be stored in memory (e.g., RAM 530, ROM 540) and/or in one or more databases comprising secondary storage 550.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus ("USB") interface devices, serial interfaces, token ring devices, fiber distributed data interface ("FDDI") devices, wireless local area network ("WLAN") devices, radio transceiver devices such as code division multiple access ("CDMA") devices, global system for mobile communications ("GSM") radio transceiver devices, worldwide interoperability for microwave access ("WiMAX") devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component might include separate receiving and transmitting units or a single transceiver. Information transmitted or received by the transceiver may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling an aircraft (such as the aircraft 100 (FIG. 1), the aircraft 300 (FIG. 3), and/or the aircraft 1602 (FIG. 6)) and/or a navigation system (such as the navigation system 1500 (FIG. 5)). The baseband signal, the signal embedded in the carrier wave, or other types of signals currently used or hereafter developed may be referred to as the transmission medium and may be generated according to several methods well known to one skilled in the art. In one embodiment, network connectivity devices 520 may be used to communicate with an enterprise system 595.

In a particular embodiment, enterprise system 595 may include one or more databases for storing data communicated to the enterprise system, as well as modules for accessing and/or processing the data and I/O devices for interacting with and/or displaying the pre- or post-processed data. Such data may include an ID number, weight, CG, and inertia information associated with a payload. The data may also identify a type of the aircraft and control gain data determined for the combination of aircraft and payload. This information may be leveraged later for later aircraft/payload combination so that the information can be provided. Enterprise system 595 may also receive sensor data from sensors 590, which may be stored in one or more databases comprising enterprise system.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives, tape drives, or solid-state drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors 590 (e.g., sensors 116, 118, 119 of aircraft 100), motor drive electronics, or other well-known input or output devices, such a cyclic control, collective control, and pedal inputs used by a pilot, co-pilot, or remote pilot. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of any of the control systems (e.g., control system 120 of aircraft 100) and/or other electronic systems disclosed herein. Further, inputs provided through an I/O device 560 may communicate with aircraft component control 570. Feedback via aircraft response 580 and/or sensors 590 (e.g., sensors 116, 118, 119, and/or other aircraft system sensors) may further communicate through one or more of the network connectivity devices 520 to provide feedback to control aircraft 100 and its associated systems.

It is to be understood by those skilled in the art that system 500 may be implemented in a variety of forms including hardware, software, firmware, special purpose processors and combinations thereof, and may comprise an autonomous flight system. System 500 may receive input from a variety of sources including on-board sources such as sensors 590 and a pilot system 600 as well as external sources such as a remote system 605, global positioning system satellites or other location positioning systems and the like. For example, system 500 may receive a flight plan including starting and ending locations for a mission from pilot system 600 and/or remote system 605. Thereafter system 500 is operable to autonomously control all aspects of flight of an aircraft of the present disclosure.

For example, during the various operating modes of aircraft 100 including vertical takeoff and landing mode, hover flight mode, forward flight mode, and transitions therebetween, commands are provided to controllers 570, which enable independent operation of each propulsion assembly 115 including, for example, controlling the rotational speed of the rotors, changing the pitch of the rotor blades, adjusting the thrust vectors and the like. In addition, these commands enable transition of aircraft 100 between the vertical lift orientation and the forward thrust orientation. Feedback may be received from controllers 570 and each propulsion assembly 115. This feedback is processed by processor 510 and can be used to supply correction data and other information to controllers 570. Sensors 590, such as positioning sensors, attitude sensors, speed sensors, environmental sensors, fuel sensors, temperature sensors, location sensors and the like, also provide information to further enhance autonomous control capabilities.

Some or all of the autonomous control capability of system 500 can be augmented or supplanted by a remote flight control system, such as remote system 605. Remote system 605 may include one or computing systems that may be implemented on general-purpose computers, special purpose computers or other machines with memory and processing capability. For example, the computing systems may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 605 may communicate with flight control system 500 via network connectivity devices 520 using include both wired and wireless connections.

Remote system 605 preferably includes one or more flight data display devices configured to display information relating to one or more aircraft of the present disclosure. Display devices may be configured in any suitable form, including, for example, liquid crystal displays, light emitting diode displays, cathode ray tube displays or any suitable type of display. Remote system 605 may also include audio output and input devices such as a microphone, speakers and/or an audio port allowing an operator to communicate with, for example, a pilot on board aircraft 100. The display device may also serve as a remote input device if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 600. Pilot system 600 may be integrated with system 500 or may be a standalone system preferably including a non-transitory computer readable storage medium including a set of computer instructions executable by a processor and may be implemented by a general-purpose computer, a special purpose computer or other machine with memory and processing capability. Pilot system 600 may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. Pilot system 600 may be a microprocessor-based system operable to execute program code in the form of machine-executable instructions. In addition, pilot system 600 may be connectable to other computer systems via a proprietary encrypted network, a public encrypted network, the Internet or other suitable communication network that may include both wired and wireless connections. Pilot system 600 may communicate with system 500 via a communication channel that preferably includes a wired connection.

Pilot system 600 preferably includes a cockpit display device configured to display information to an onboard pilot. Cockpit display device may be configured in any suitable form, including, for example, as one or more display screens such as liquid crystal displays, light emitting diode displays and the like or any other suitable display type including, for example, a display panel, a dashboard display, an augmented reality display or the like. Pilot system 600 may also include audio output and input devices such as a microphone, speakers and/or an audio port allowing an onboard pilot to communicate with, for example, air traffic control or an operator of a remote system. Cockpit display device may also serve as a pilot input device if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinarily skill in the art, through the use of system 500, an aircraft of the present disclosure can be operated responsive to a flight control protocol including autonomous flight control, remote flight control or onboard pilot flight control and combinations thereof.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. A navigation system for an aircraft, comprising:
   a plurality of camera groups, each camera group comprising at least two cameras mounted to a body of the aircraft and directed away from the aircraft, each camera group to capture a set of images of a portion of an environment that surrounds the aircraft, the set of images captured by a given camera group having an overlapping a field of view; and
   a processing component coupled to the plurality of camera groups, the processing component to:
      receive a set of images from one of the camera groups;
      identify an object that appears in each of the set of images;
      determine, for each camera in the camera group, a distance from the camera to the object and an angle of the camera relative to the object; and
      determine a current position of the aircraft based on the determined distances and angles.

2. The navigation system of claim 1, wherein the processing component is to:
   determine a first distance from the object to a first camera in the camera group and a first angle of the object relative to the first camera based on a first image of the set of images; and
   determine a second distance from the object to a second camera in the camera group and a second angle of the object relative to the second camera based on a second image of the set of images.

3. The navigation system of claim 1, wherein a first camera group of the plurality of camera groups is directed in a first direction, and a second camera group of the plurality of camera groups is directed in a second direction.

4. The navigation system of claim 3, wherein the first camera group is mounted to a front of the body of the aircraft, and the second camera group is mounted to a back of the aircraft.

5. The navigation system of claim 1, wherein each camera group is a group of stereoscopic cameras.

6. The navigation system of claim 1, wherein the processing component is to:
   identify a prior location of the aircraft; and
   determine a position of the object relative to the aircraft based on the set of images; and determine the current position of the aircraft based on the prior location of the aircraft and the determined position of the object relative to the aircraft.

7. The navigation system of claim 1, the processing component further to instruct a camera group of the plurality of camera groups to capture the set of images, the set of images captured simultaneously.

8. The navigation system of claim 1, wherein the object is a landmark having a known location.

9. The navigation system of claim 1, wherein the set of images comprises a first image captured by a first camera and a second image captured by a second camera, the first camera and the second camera having an offset distance.

10. The navigation system of claim 9, wherein a position of the object in the first image is offset from a position of the object in the second image based on the offset distance between the first camera and the second camera.

11. An aircraft, comprising:
a body that includes a fuselage of the aircraft;
a first group of cameras mounted to the body of the aircraft and directed away from the aircraft, the first group of cameras comprising:
a first camera to capture a first image of a portion of an environment that surrounds the aircraft;
a second camera offset from the first camera, the second camera to capture a second image of the portion of the environment, the first image and the second image having an overlapping field of view;
a second group of cameras mounted to the body of the aircraft and directed away from the aircraft; and
a processing component to determine a location of the aircraft, the processing component coupled to the first group of cameras and the second group of cameras, wherein the processing component is to:
identify an object that appears in the first image and the second image; and
utilize the first image and the second image to determine a current location of the based on respective distances of the first camera and the second camera to the object and respective angles of the first camera and the second camera relative to the object.

12. The aircraft of claim 11, wherein the processing component is to:
determine a first distance between the first camera and the object based on the first image;
determine a first angle of the object relative to the first camera based on the first image;
determine a second distance between the second camera and the object based on the second image;
determine a second angle of the object relative to the second camera based on the second image; and
determine a location of the object relative to the aircraft based on the first distance, the first angle, the second distance, and the second angle.

13. The aircraft of claim 11, wherein the first camera is a first stereoscopic camera, and the second camera is a second stereoscopic camera.

14. The aircraft of claim 11, further comprising a global positioning system (GPS) coupled to the processing component, wherein the processing component is to cause the first camera to capture the first image and the second camera to capture the second image in response to a determination that the GPS is unavailable.

15. The aircraft of claim 11, wherein the second group of cameras are directed to capture images in a different direction from which the first group of cameras is directed to capture images, and wherein the processing component is further to utilize the images captured by the second group of cameras to determine the current location of the aircraft.

16. The aircraft of claim 13, wherein the first group of cameras are mounted to a front of the body of the aircraft, and wherein the second group of cameras are mounted to a back of the aircraft.

17. A method of determining a current location of an aircraft, comprising:
retrieving, by a processing component, a first image of a portion of an environment from a first camera mounted to a body of the aircraft and directed away from the aircraft;
retrieving, by the processing component, a second image of the portion of the environment from a second camera mounted to the body of the aircraft and directed away from the aircraft, the second camera at an offset location relative to the first camera, the second image captured simultaneously with the first image;
identifying, by the processing component, an object that appears in the first image and the second image;
determining, by the processing component, a position of the object relative to the aircraft based on the first image and the second image, the position of the object relative to the aircraft determined based on respective distances of the first camera and the second camera to the object and respective angles of the first camera and the second camera relative to the object; and
determining, by the processing component, the current location of the aircraft based on the position of the object relative to the aircraft.

18. The method of claim 17, wherein determining the current location of the aircraft includes:
identifying, by the processing component, a prior location of the aircraft; and
determining, by the processing component, the current location of the aircraft based on the prior location of the aircraft and the position of the object relative to the aircraft.

19. The method of claim 17, wherein the object is a landmark having a known location, and determining the current location of the aircraft based on the position of the object relative to the aircraft comprises determining the current location of the aircraft based on the known location of the object and the position of the landmark relative to the aircraft.

20. The method of claim 17, wherein the first camera and the second camera have a camera offset distance, the method further comprising:
determining an image offset distance between a position of the object in the first image and a position of the object in the second image; and
determining the position of the object relative to the aircraft based on the camera offset distance and the image offset distance.

* * * * *

UNITED STATES PATENT AND TRADEMARK OFFICE
CERTIFICATE OF CORRECTION

| | |
|---|---|
| PATENT NO. | : 11,644,828 B2 |
| APPLICATION NO. | : 17/244652 |
| DATED | : May 9, 2023 |
| INVENTOR(S) | : Maurice D. Griffin et al. |

It is certified that error appears in the above-identified patent and that said Letters Patent is hereby corrected as shown below:

In the Claims

In Column 25, Claim 11, Line 39, delete "a current location of the" and insert -- a current location of the object --, therefor.

Signed and Sealed this
Twenty-seventh Day of June, 2023

Katherine Kelly Vidal
*Director of the United States Patent and Trademark Office*